US009235005B2

(12) United States Patent
Sato et al.

(10) Patent No.: US 9,235,005 B2
(45) Date of Patent: Jan. 12, 2016

(54) METHOD OF FUSION-SPLICING OPTICAL FIBERS AND FUSION SPLICER

(75) Inventors: Ryuichiro Sato, Yokohama (JP);
Hiroyasu Toyooka, Yokohama (JP);
Hiroshi Takayanagi, Yokohama (JP)

(73) Assignee: SEI OPTIFRONTIER CO., LTD., Kanagawa (JP)

( * ) Notice: Subject to any disclaimer, the term of this patent is extended or adjusted under 35 U.S.C. 154(b) by 316 days.

(21) Appl. No.: 13/976,302

(22) PCT Filed: Feb. 2, 2012

(86) PCT No.: PCT/JP2012/052387
§ 371 (c)(1),
(2), (4) Date: Jun. 26, 2013

(87) PCT Pub. No.: WO2012/111447
PCT Pub. Date: Aug. 23, 2012

(65) Prior Publication Data
US 2013/0277356 A1 Oct. 24, 2013

(30) Foreign Application Priority Data
Feb. 18, 2011 (JP) ................................. 2011-032817

(51) Int. Cl.
*G02B 6/255* (2006.01)
*G02B 6/38* (2006.01)

(52) U.S. Cl.
CPC ............ *G02B 6/2551* (2013.01); *G02B 6/2555* (2013.01); *G02B 6/2557* (2013.01); *G02B 6/2558* (2013.01); *G02B 6/3846* (2013.01)

(58) Field of Classification Search
None
See application file for complete search history.

(56) References Cited

U.S. PATENT DOCUMENTS

| 2005/0175291 | A1 | 8/2005 | De Marchi | |
|---|---|---|---|---|
| 2005/0201692 | A1 | 9/2005 | De Marchi | |
| 2009/0162019 | A1* | 6/2009 | Lichoulas et al. | 385/99 |
| 2009/0238523 | A1 | 9/2009 | Honma et al. | |
| 2010/0014811 | A1 | 1/2010 | Uboldi | |

FOREIGN PATENT DOCUMENTS

| CN | 201199271 Y | 2/2009 |
|---|---|---|
| CN | 101852894 A | 10/2010 |

(Continued)

OTHER PUBLICATIONS

Otani et al., Machine Translation of JP 08-194127, Jul. 30 1996.*

(Continued)

*Primary Examiner* — Michelle R Connelly
(74) *Attorney, Agent, or Firm* — Global IP Counselors, LLP

(57) ABSTRACT

A method of fusion-splicing includes attaching a stab to a stub cap having a non-axisymmetric structure, positioning an embedded optical fiber to a fusion splicing working part by fixing the stub cap thereto; positioning an outside optical fiber to the fusion splicing working part; fusion-splicing the embedded optical fiber and the outside optical fiber; repositioning the embedded optical fiber to a reinforcing working part by fixing the stub cap thereto and repositioning the outside optical fiber to the reinforcing working part such that a relative positional relationship between the embedded optical fiber and the outside optical fiber becomes the same as that at the fusion splicing working part; and reinforcing a spliced portion between the embedded optical fiber and the outside optical fiber while a tension is applied to the embedded optical fiber and the outside optical fiber.

4 Claims, 9 Drawing Sheets

(56) References Cited

FOREIGN PATENT DOCUMENTS

| | | | |
|---|---|---|---|
| EP | 0576266 | A2 | 12/1993 |
| EP | 0576266 | A3 | 12/1993 |
| JP | 06-109946 | A | 4/1994 |
| JP | 06-130243 | A | 5/1994 |
| JP | 08194127 | A * | 7/1996 |
| JP | 10-227946 | A | 8/1998 |
| JP | 2002-082257 | A | 3/2002 |
| JP | 2005-531020 | A | 10/2005 |
| JP | 2005-531045 | A | 10/2005 |
| JP | 2007-286599 | A | 1/2007 |
| JP | 2008-181004 | A | 8/2008 |
| JP | 2010-504545 | | 2/2010 |
| JP | 2011-107211 | A | 6/2011 |
| WO | 2008-059843 | A1 | 5/2008 |
| WO | WO 2010105959 | A2 * | 9/2010 |

OTHER PUBLICATIONS

Notification of the First Office Action of the counterpart Chinese Patent Application No. 201280009537.3, dated Apr. 3, 2015.

Extended European Search Report of the corresponding European Patent Application No. 12 746 764.5, dated Jul. 23, 2014.

* cited by examiner

METHOD OF FUSION-SPLICING OPTICAL FIBERS AND FUSION SPLICER

CROSS-REFERENCE TO RELATED APPLICATIONS

This U.S. National stage application claims priority under 35 U.S.C. §119(a) to Japanese Patent Application No. 2011-032817, filed in Japan on Feb. 18, 2011, the entire contents of which are hereby incorporated herein by reference.

TECHNICAL FIELD

The present invention relates to a method of fusion-splicing optical fibers to each other and a fusion splicer.

BACKGROUND ART

In constructing an access network with optical fibers, optical connectors are desired to be attached to optical fibers on site. Such an optical connector for fusion splicing that is to be attached on site includes a stub in which an embedded optical fiber is attached to a ferrule. A glass fiber that is the embedded optical fiber of the stub is fusion-spliced to a glass fiber included in an outside optical fiber on site (see Japanese Unexamined Patent Application Publication (Translation of PCT Application) No. 2005-531020, Japanese Unexamined Patent Application Publication (Translation of PCT Application) No. 2005-531045, Japanese Unexamined Patent Application Publication (Translation of PCT Application) No. 2010-504545, Japanese Unexamined Patent Application Publication No. 10-227946, and Japanese Unexamined Patent Application Publication No. 2002-82257). A spliced portion at which the glass fibers are fused and spliced to each other is reinforced with a reinforcing member provided thereover.

To fusion-splice the glass fiber included in the stub and the glass fiber included in the outside optical fiber with each other, the glass fibers are set on a fusion splicer and the tips thereof are positioned by aligning the glass fibers to a splicing position where discharge electrodes are provided. After fusion splicing is performed, the spliced portion is reinforced at a position for reinforcing work that is different from the position for fusion splicing work. Regarding this process, there are some techniques of moving optical fibers while preventing the optical fibers from bending or twisting.

According to Japanese Unexamined Patent Application Publication (Translation of PCT Application) No. 2005-531020, a mechanism that moves a fixing part, where a stub and an optical fiber are fixed, and electrodes relative to each other is provided, and fusion splicing is performed with the fixing part and the electrodes being positioned close to each other. In a case where such a mechanism is provided, the fixing part or the electrodes need to be returned to the initial positions accurately before subsequent fusion splicing work is performed. It is difficult, however, to return them accurately, resulting in a possible misplacement. Consequently, the reliability in fusion splicing is reduced. Movement mechanisms that are disclosed by Japanese Unexamined Patent Application Publication No. 6-130243 and Japanese Unexamined Patent Application Publication No. 6-109946 are movable relatively accurately. Instead, the configurations of the mechanisms are complicated and of large scales, leading to a cost increase. Japanese Unexamined Patent Application Publication No. 2007-286599 discloses a technique in which a handle is provided to a ferrule gripping tool, and by gripping the handle and an optical fiber as an object of splicing, the optical fiber and a ferrule are moved after they have been fusion-spliced to each other. In this technique, the cost increase is smaller than that of the technique employing movement mechanisms, but the optical fiber may remain axially rotated, or twisted.

SUMMARY OF INVENTION

Technical Problem

It is an object of the present invention to provide a fusion splicing method and a fusion splicer in each of which, without the use of any large-scale movement mechanisms or the like that may lead to a cost increase, a spliced portion between optical fibers that have been fusion-spliced to each other is reinforced while the optical fibers are maintained not to have any bends, twists, or slack, whereby the reliability at the reinforced portion is increased.

Solution to Problem

To achieve the above object, the present invention provides a method of fusion-splicing an embedded optical fiber included in a stub and an outside optical fiber to each other. The method includes (1) attaching a stub cap having a non-axisymmetric structure to the stub, (2) positioning the embedded optical fiber and the outside optical fiber to a fusion splicing working part by fixing the stub cap to the fusion splicing working part and by gripping the outside optical fiber with a fiber holder that is fixed to the fusion splicing working part, (3) fusion-splicing the embedded optical fiber and the outside optical fiber to each other, (4) gripping the outside optical fiber at the fusion splicing working part with a carrying fiber holder different from the fiber holder and having a non-axisymmetric structure, (5) repositioning the embedded optical fiber and the outside optical fiber to a reinforcing working part by fixing the stub cap and the carrying fiber holder to the reinforcing working part such that a relative positional relationship between the stub cap and the carrying fiber holder becomes the same as that at the fusion splicing working part, and (6) reinforcing a spliced portion between the embedded optical fiber and the outside optical fiber while a tension is applied to the embedded optical fiber and the outside optical fiber. Here, the outside optical fiber is any optical fiber other than the embedded optical fiber and is in general longer than the embedded optical fiber.

According to another embodiment of the present invention, there is provided a method of fusion-splicing an embedded optical fiber included in a stub and an outside optical fiber to each other. The method includes (1) attaching a stub cap having a non-axisymmetric structure to the stub, (2) gripping the outside optical fiber with a fiber holder having a non-axisymmetric structure, (3) positioning the embedded optical fiber and the outside optical fiber to a fusion splicing working part by fixing the stub cap and the fiber holder to the fusion splicing working part, (4) fusion-splicing the embedded optical fiber and the outside optical fiber to each other, (5) repositioning the embedded optical fiber and the outside optical fiber to a reinforcing splicing working part by fixing the stub cap and the fiber holder to the reinforcing working part such that a relative positional relationship between the stub cap and the fiber holder becomes the same as that at the fusion splicing working part, and (6) reinforcing a spliced portion between the embedded optical fiber and the outside optical fiber while a tension is applied to the embedded optical fiber and the outside optical fiber.

The present invention also provides a fusion splicer that includes a fusion splicing working part including a first fusion splicing fixing part to which a stub cap having a non-axisymmetric structure and attached to a stub that includes an embedded optical fiber is to be fixed, a second fusion splicing fixing part to which a first fiber holder having a non-axisymmetric structure and configured to grip an outside optical fiber is to be fixed, a second fiber holder configured to grip the outside optical fiber at a position that is nearer to the tip than a position gripped by the first fiber holder, and a fusion splicing processing part at which the embedded optical fiber and the outside optical fiber that are axially aligned with each other by the first fusion splicing fixing part and the second fiber holder, respectively, are to be fusion-spliced to each other; and a reinforcing working part including a first reinforcing fixing part and a second reinforcing fixing part that are in the same relative positional relationship as the first fusion splicing fixing part and the second fusion splicing fixing part and to which the stub cap and the first fiber holder are to be fixed, respectively, and an urging member that applies a tension to the embedded optical fiber and the outside optical fiber that are positioned by the first reinforcing fixing part and the second reinforcing fixing part, respectively, the reinforcing working part being configured to reinforce a spliced portion between the embedded optical fiber and the outside optical fiber.

According to another embodiment of the present invention, there is provided a fusion splicer that includes a fusion splicing working part including a first fusion splicing fixing part to which a stub cap having a non-axisymmetric structure and attached to a stub that includes an embedded optical fiber is to be fixed, a second fusion splicing fixing part to which a fiber holder having a non-axisymmetric structure and configured to grip an outside optical fiber is to be fixed, and a fusion splicing processing part at which the embedded optical fiber and the outside optical fiber that are positioned by the first fusion splicing fixing part and the second fusion splicing fixing part, respectively, are to be fusion-spliced to each other; and a reinforcing working part including a first reinforcing fixing part and a second reinforcing fixing part that are in the same relative positional relationship as the first fusion splicing fixing part and the second fusion splicing fixing part and to which the stub cap and the fiber holder are to be fixed, respectively, and an urging member that applies a tension to the embedded optical fiber and the outside optical fiber that are positioned by the first reinforcing fixing part and the second reinforcing fixing part, respectively, the reinforcing working part being configured to reinforce a spliced portion between the embedded optical fiber and the outside optical fiber.

Advantageous Effects of Invention

According to the present invention, the embedded optical fiber and the outside optical fiber that have been fusion-spliced to each other can be reinforced with no bends or no twists in them. Furthermore, a tension is applied at the reinforcing working part to the embedded optical fiber and the outside optical fiber that have been fusion-spliced to each other. Therefore, the embedded optical fiber and the outside optical fiber that have been fusion-spliced to each other can be reinforced with no slack in them.

DESCRIPTION OF EMBODIMENTS

Figure 1:
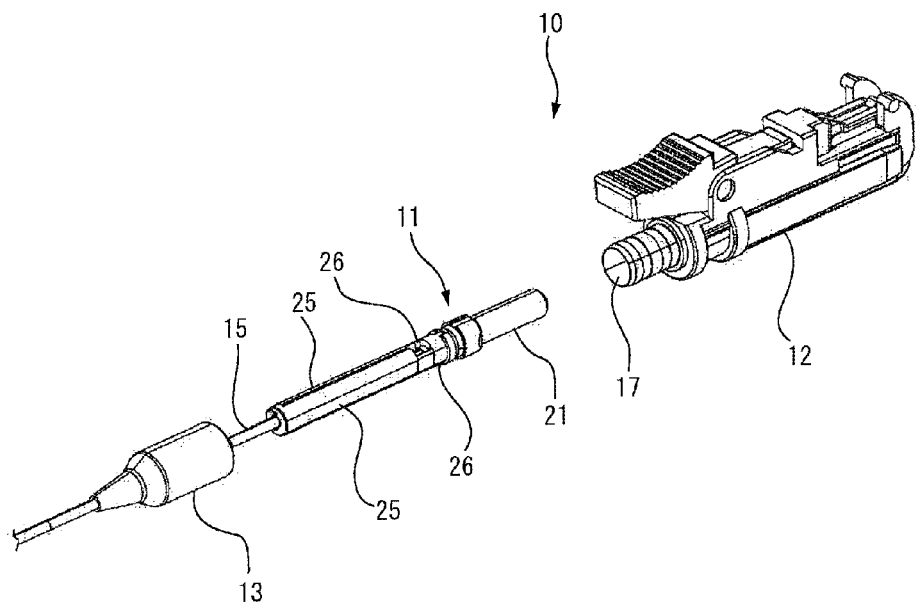
FIG. 1 is an exploded perspective view of an exemplary optical connector to which fusion splicing according to the present invention is applied.

Embodiments of the present invention will now be described with reference to the drawings. The drawings are for illustrative purposes and do not limit the scope of the invention. In the drawings, to avoid redundant description, identical reference numerals denote like elements, and the scales of the drawings are not necessarily exact.

FIG. 1 is an exploded perspective view of an optical connector 10, which is an exemplary optical connector to which fusion splicing according to the present invention is applied. The optical connector 10 includes a stub 11, a housing 12, and a boot 13. The stub 11 is connected to an end of an optical fiber cord (outside optical fiber) 15 and is fitted in the housing 12. The housing 12 has a fitting hole 17. The stub 11 is inserted into the fitting hole 17 of the housing 12 and is thus fitted in the housing 12. With the stub 11 being fitted in the housing 12, the boot 13 is attached to the housing 12. Thus, a portion of the housing 12 where the stub 11 is fitted is covered with the boot 13.

Figure 2:
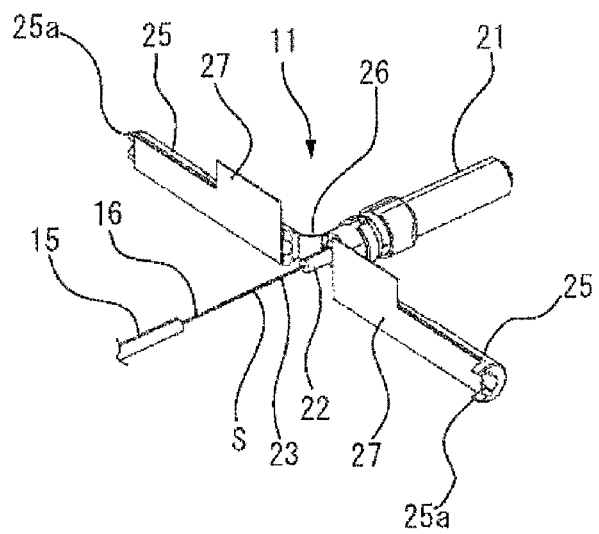
FIG. 2 is a perspective view of a stub included in the optical connector illustrated in FIG. 1.

FIG. 2 is a perspective view of the stub 11 included in the optical connector 10. The stub 11 includes a ferrule 21 and a short optical fiber (embedded optical fiber 22) that is fitted in a fitting hole (not illustrated) provided in the center of the ferrule 21. The embedded optical fiber 22 includes a glass fiber 23, to which a glass fiber 16 exposed from the sheath of the optical fiber cord 15 is fusion-spliced. The optical fiber cord 15 is a cord in which an optical fiber including the glass fiber 16 that is covered with an ultraviolet-curable-resin sheath and thus having an outside diameter of 0.25 mm is further covered with a resin, thereby having an outside diameter of 0.9 mm. Instead of the optical fiber cord 15, an alternative optical fiber may be used. In such a case, the glass fiber 16 exposed at the end of the optical fiber and the glass fiber 23 included in the embedded optical fiber 22 are fusion-spliced.

The ferrule 21 includes a pair of reinforcing members 25 provided at the rear end thereof. One end of each of the reinforcing members 25 is connected to the ferrule 21 with a corresponding one of hinge parts 26, whereby the reinforcing members 25 are rotatable about the respective hinge parts 26. By rotating the reinforcing members 25 toward the glass fiber 23, the reinforcing members 25 meet each other, whereby a spliced portion S between the glass fibers 16 and 23 and the periphery thereof are covered with the reinforcing members 25 and are thus reinforced. Adhesive is applied to contact surfaces 25a of the reinforcing members 25 that are to meet each other. Pieces of release paper 27 are pasted on the contact surfaces 25a. To bond and fix the reinforcing members 25 to each other by making the reinforcing members 25 meet each other, the pieces of release paper 27 are removed, and the adhesive on the contact surfaces 25a is exposed.

Figure 3:
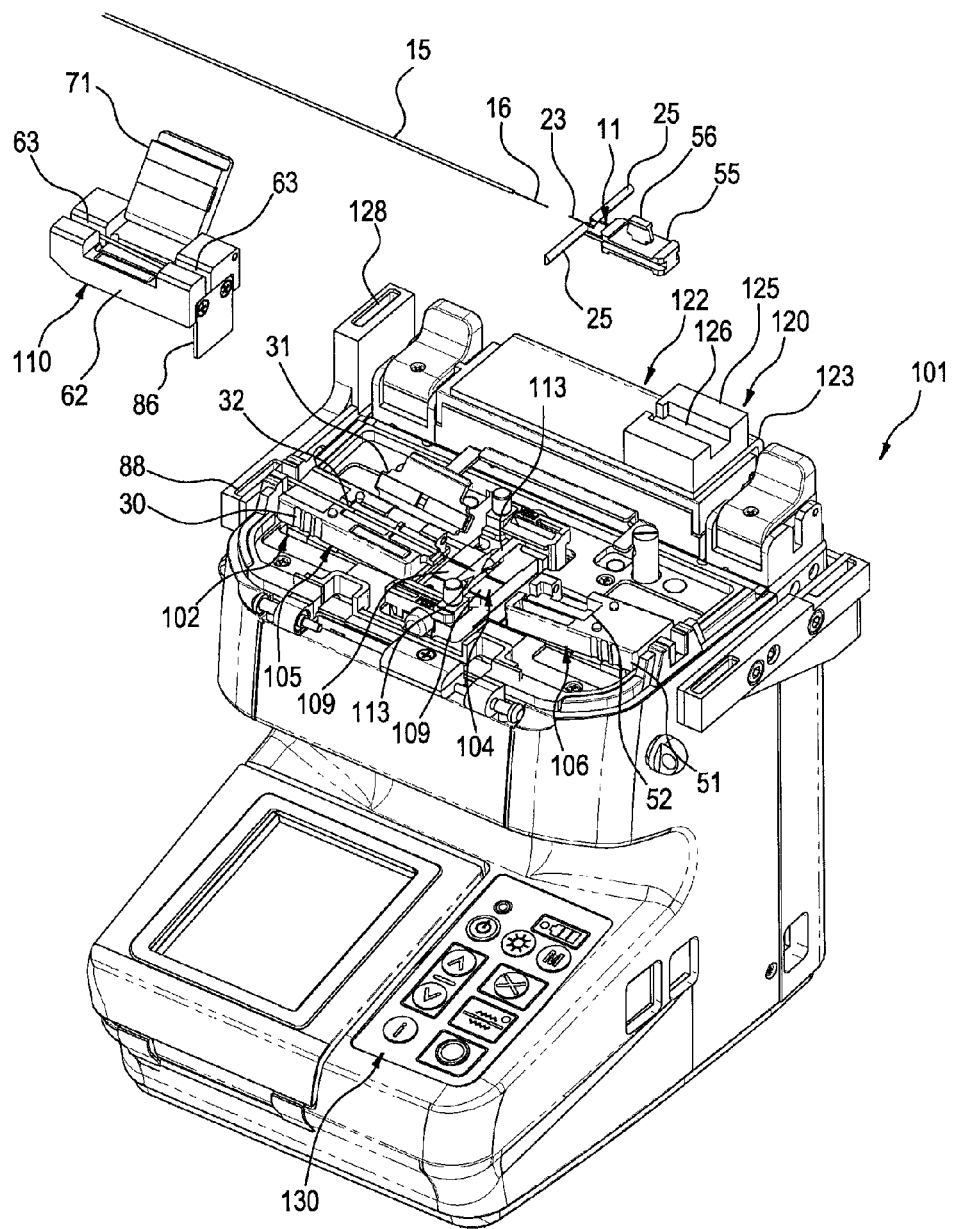
FIG. 3 is a perspective view of a fusion splicer according to an embodiment of the present invention.

FIG. 3 is a perspective view of a fusion splicer 101 according to an embodiment of the present invention. The fusion splicer 101 is, for example, an apparatus that fuses and splices the glass fiber 16 of the optical fiber cord 15 and the glass fiber 23 of the stub 11 to each other at a site where an optical fiber facility is constructed. The fusion splicer 101 includes a fusion splicing working part 102 (fusion splicing fixing part) and a reinforcing working part 120 that are provided at the top thereof. At the fusion splicing working part 102, fusion splicing work is performed in which the glass fiber 16 of the optical fiber cord 15 and the glass fiber 23 of the stub 11 are fusion-spliced to each other. At the reinforcing working part 120, reinforcing work is performed on the spliced portion S between the glass fiber 16 of the optical fiber cord 15 and the glass fiber 23 of the stub 11. The fusion splicing working part 102 includes a second fiber holder (fiber holder 105) and a first fusion splicing fixing part (stub holder 106).

Figure 4:
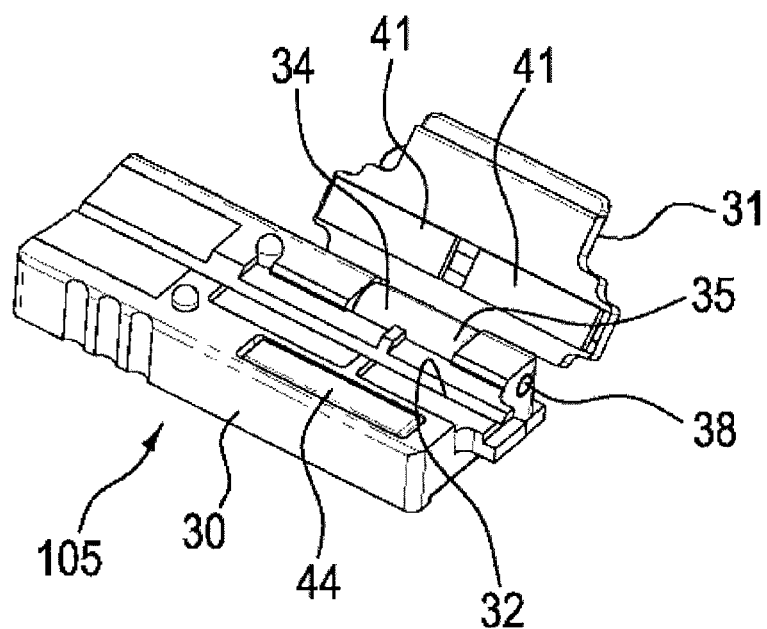
FIG. 4 is a perspective view of a fiber holder included in the fusion splicer illustrated in FIG. 3.

FIG. 4 is a perspective view of the fiber holder 105 included in the fusion splicer 101. The fiber holder 105 includes a holder body 30 having a substantially cuboid shape. The holder body 30 has a receiving groove 32 in the upper surface thereof. The receiving groove 32 receives a sheathed portion of the optical fiber cord 15.

The holder body 30 is provided with a holding lid 31 on one side thereof. The holding lid 31 includes a hinge part 34. The hinge part 34 is fitted in a holding groove 35 provided in the holder body 30. The holder body 30 is provided with a connecting pin 38 extending through the holding groove 35. The connecting pin 38 passes through a through hole provided in the hinge part 34. Thus, the holding lid 31 is connected to the holder body 30 in such a manner as to be rotatable about the axis of the connecting pin 38, and the upper surface of the holder body 30 is exposed or covered by rotating the holding lid 31. Furthermore, by rotating the holding lid 31 toward the upper surface of the holder body 30, the holding lid 31 is positioned over the receiving groove 32. The holding lid 31 has pressing plate portions 41 provided on a surface thereof that faces the holder body 30. The pressing plate portions 41 are made of, for example, an elastic material such as rubber. By rotating the holding lid 31 toward the upper surface of the holder body 30, the pressing plate portions 41 are positioned over the receiving groove 32.

Furthermore, the holder body 30 is provided with a magnet 44 on a side of the upper surface thereof opposite the side thereof to which the holding lid 31 is connected. When the holding lid 31 is positioned over the upper surface of the holder body 30, the holding lid 31 comes into contact with the magnet 44. The holding lid 31 is made of a magnetic substance such as iron. Hence, when the holding lid 31 is positioned over the upper surface of the holder body 30, the holding lid 31 is attracted to the upper surface of the holder body 30 by the magnetic force of the magnet 44.

The fiber holder 105 holds the optical fiber cord 15 with the holding lid 31 being attracted to the holder body 30 by the magnetic force of the magnet 44. The fiber holder 105 that holds the optical fiber cord 15 has a substantially cuboid shape. Therefore, in a state where the fiber holder 105 is holding the optical fiber cord 15, the fiber holder 105 has a non-axisymmetric structure that is non-axisymmetric to the axis of the optical fiber cord 15.

The stub holder 106 includes a holder body 51. The holder body 51 has a cap receiving recess 52 provided in the upper surface thereof. The cap receiving recess 52 receives a stub cap 55 that holds the stub 11.

Figure 5:
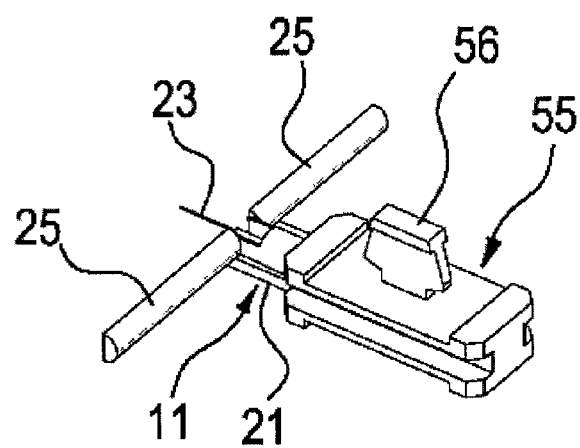
FIG. 5 is a perspective view of an exemplary stub cap employed in the present invention that is holding the stub.

FIG. 5 is a perspective view of the stub cap 55 employed in the present invention with a stub held by the stub cap 55. The stub cap 55 has a substantially cuboid shape and includes a grip part 56 provided on the upper surface thereof. The stub cap 55 has a holding hole (not illustrated) provided at one end thereof. By inserting the stub 11 into the holding hole, the stub 11 is held by the stub cap 55. In this state, the stub 11 is held by the stub cap 55 while being prevented from rotating about the axis thereof. Therefore, when the stub 11 is held by the stub cap 55, the stub 11 can be handled easily by gripping the stub cap 55, which is easy to grip. When the stub cap 55 that is holding the stub 11 is fitted into the cap receiving recess 52 of the stub holder 106, the stub 11 is fixed to the stub holder 106.

The stub cap 55 has a substantially cuboid shape. Therefore, in a state where the stub cap 55 is holding the stub 11, the stub cap 55 has a non-axisymmetric structure that is non-axisymmetric to the axis of the embedded optical fiber 22 of the stub 11. Accordingly, in a state where the stub cap 55 is held by the stub holder 106, the stub holder 106 is also non-axisymmetric to the axis of the embedded optical fiber 22 of the stub 11.

The fiber holder 105 and the stub holder 106 are provided at positions that are symmetrical to each other with respect to a fusion splicing processing part 104 that is provided between the fiber holder 105 and the stub holder 106. The fusion splicing processing part 104 includes a pair of V-grooved members 109 that position the tips of the glass fiber 23 of the embedded optical fiber 22 of the stub 11 and the glass fiber 16 of the optical fiber cord 15, respectively, and electrodes 113 provided between the pair of V-grooved members 109 and fusing, by discharging electricity, the end facets of the glass fibers 16 and 23 that are positioned against each other.

The fiber holder 105 and the stub holder 106 are supported by respective movement mechanisms (not illustrated) each including a triaxial stage. The movement mechanisms enable the positioning of the glass fibers 16 and 23 by moving the fiber holder 105 and the stub holder 106 in horizontal directions and vertical directions. At the fusion splicing processing part 104, the glass fibers 16 and 23 positioned at a fusion splicing position are thermally fused by the electrodes 113 and are thus spliced to each other.

Figure 6:
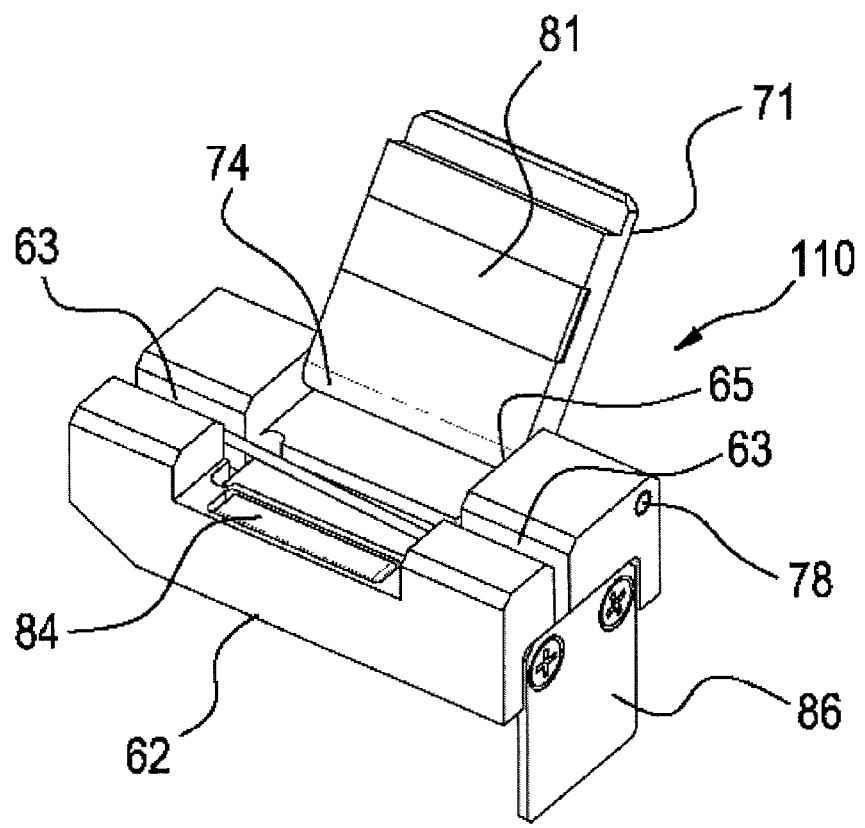
FIG. 6 is a perspective view of a carrying fiber holder included in the fusion splicer illustrated in FIG. 3.

The fusion splicing working part 102 of the fusion splicer 101 includes a first fiber holder (carrying fiber holder 110) that is detachably provided on a side of the fiber holder 105 that is opposite the fusion splicing processing part 104. FIG. 6 is a perspective view of the carrying fiber holder 110 included in the fusion splicer 101 illustrated in FIG. 3. The carrying fiber holder 110 includes a holder body 62 having a substantially cuboid shape. The holder body 62 has a receiving groove 63 provided in the upper surface thereof and receiving a sheathed portion of the optical fiber cord 15.

The holder body 62 is provided with a holding lid 71 on one side thereof. The holding lid 71 includes a hinge part 74. The hinge part 74 is fitted in a holding groove 65 provided in the holder body 62. The holder body 62 is provided with a connecting pin 78 extending through the holding groove 65. The connecting pin 78 passes through a through hole provided in the hinge part 74. Thus, the holding lid 71 is connected to the holder body 62 in such a manner as to be rotatable about the axis of the connecting pin 78, and the upper surface of the holder body 62 is exposed or covered by rotating the holding lid 71. Furthermore, by rotating the holding lid 71 toward the upper surface of the holder body 62, the holding lid 71 is positioned over the holder body 62. The holding lid 71 has a pressing plate portion 81 provided on a surface thereof that faces the holder body 62. The pressing plate portion 81 is made of, for example, an elastic material such as rubber. By rotating the holding lid 71 toward the upper surface of the holder body 62, the pressing plate portion 81 is positioned over the receiving groove 63.

Furthermore, the holder body 62 is provided with a magnet 84 on a side of the upper surface thereof opposite the side thereof to which the holding lid 71 is connected. When the holding lid 71 is positioned over the upper surface of the holder body 62, the holding lid 71 comes into contact with the magnet 84. The holding lid 71 is made of a magnetic substance such as iron. Hence, when the holding lid 71 is positioned over the upper surface of the holder body 62, the holding lid 71 is attracted to the upper surface of the holder body 62 by the magnetic force of the magnet 84.

The carrying fiber holder 110 holds the optical fiber cord 15 with the holding lid 71 being attracted to the holder body 62 by the magnetic force of the magnet 84. The carrying fiber holder 110 that holds the optical fiber cord 15 has a substantially cuboid shape. Therefore, in a state where the carrying fiber holder 110 is holding the optical fiber cord 15, the carrying fiber holder 110 has a non-axisymmetric structure that is non-axisymmetric to the axis of the optical fiber cord 15.

The carrying fiber holder 110 includes an anchor plate 86 provided at one end of the holder body 62 and extending downward. The fusion splicer 101 includes a second fusion splicing fixing part (anchor hole 88) provided in the fusion splicing working part 102. The anchor plate 86 of the carrying fiber holder 110 is fittable into the anchor hole 88. By fitting the anchor plate 86 into the anchor hole 88, the carrying fiber holder 110 is attached to the fusion splicing working part 102 of the fusion splicer 101.

The reinforcing working part 120 provided on the rear side of the fusion splicer 101 with respect to the fusion splicing working part 102 includes a heat treating part 122 that is covered with a cover 123. The heat treating part 122 heats, with a heater provided thereinside, a heat-shrinkable tube provided over the spliced portion S between the glass fibers 16 and 23 and thus causes the heat-shrinkable tube to shrink with the heat.

A first reinforcing fixing part (cap holding part 125) is provided on the cover 123 of the heat treating part 122. The cap holding part 125 has a cap receiving recess 126 provided in the upper surface thereof. The cap receiving recess 126 receives the stub cap 55 that holds the stub 11.

The reinforcing working part 120 includes a second reinforcing fixing part (anchor hole 128). The anchor plate 86 of the carrying fiber holder 110 is also fittable into the anchor hole 128. By fitting the anchor plate 86 into the anchor hole 128, the carrying fiber holder 110 is attached to the reinforcing working part 120 of the fusion splicer 101. The relative positional relationship between the cap holding part 125 and the anchor hole 128 is the same as the relative positional relationship between the stub holder 106 and the anchor hole 88. In a state where the stub cap 55 and the carrying fiber holder 110 are fixed to the reinforcing working part 120, the relative positional relationship between the stub cap 55 and the carrying fiber holder 110 becomes the same as that at the fusion splicing working part 102.

An urging member (not illustrated) such as a spring is provided between the cap holding part 125 provided at the reinforcing working part 120 and the cover 123. The cap holding part 125 is urged by the urging member in a direction away from the anchor hole 128 to which the carrying fiber holder 110 is to be attached. The fusion splicer 101 configured as described above further includes an operation part 130 that activates the fusion splicing processing part 104 and the heat treating part 122.

A method of fusion-splicing the glass fiber 16 of the optical fiber cord 15 and the glass fiber 23 of the embedded optical fiber 22 of the stub 11 and reinforcing the spliced portion S between the two will now be described.

Fiber Positioning Step

Figure 7:
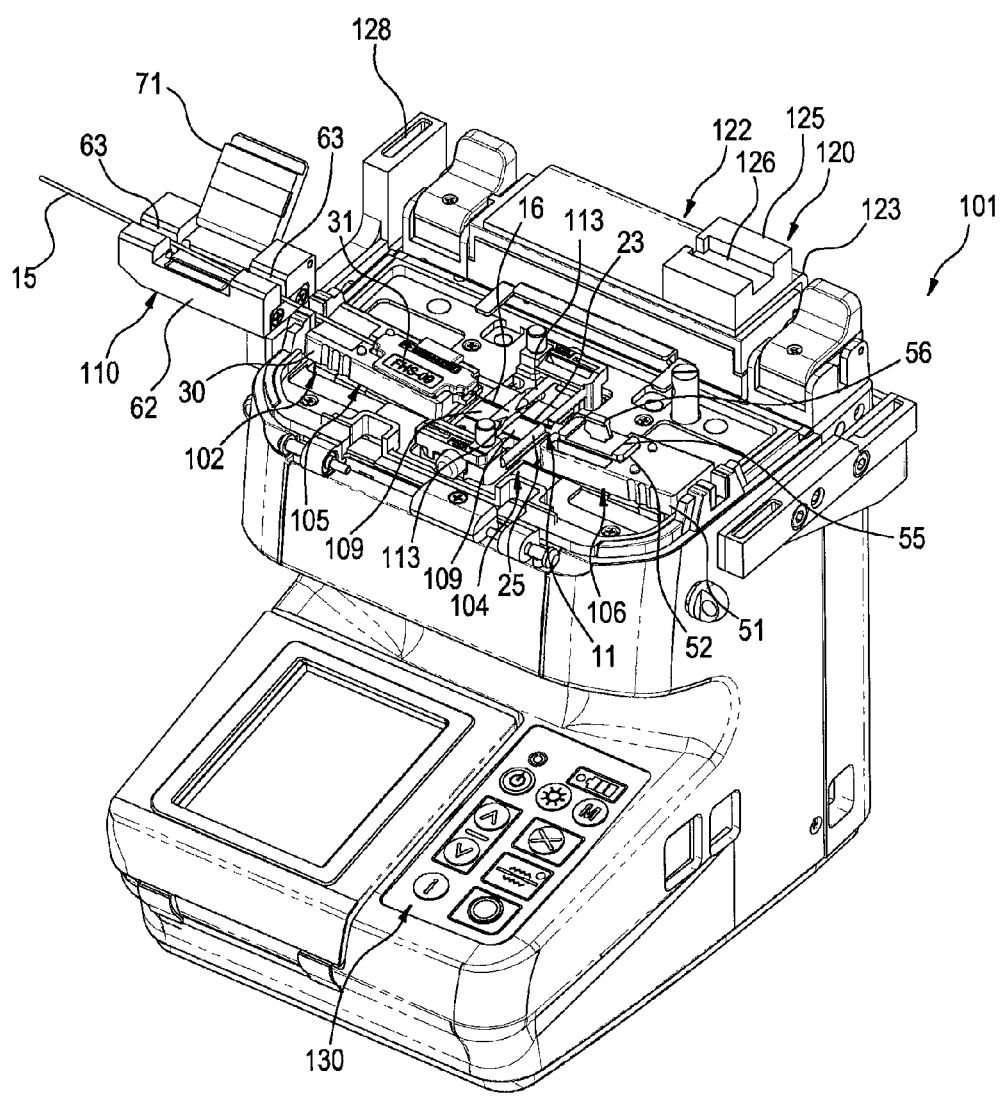
FIG. 7 is a perspective view of the fusion splicer in one of steps performed in fusion splicing.

FIG. 7 is a perspective view of the fusion splicer 101 in one of steps performed in fusion splicing. The stub cap 55 holding the stub 11 is fitted into the cap receiving recess 52 in the first fusion splicing fixing part (stub holder 106), whereby the stub cap 55 is held by the cap receiving recess 52. Furthermore, the sheathed portion of the optical fiber cord 15 from which the glass fiber 16 is exposed from the sheath by a predetermined length is placed into the receiving groove 32 of the fiber holder 105, and the holding lid 31 is closed, whereby the optical fiber cord 15 is held by the fiber holder 105.

Subsequently, the glass fiber 23 of the stub 11 and the glass fiber 16 of the optical fiber cord 15 are positioned into the V-grooved members 109, respectively, of the fusion splicing processing part 104 by moving the fiber holder 105 and the stub holder 106 in horizontal directions and vertical directions using the movement mechanisms, whereby the ends of the glass fibers 16 and 23 are positioned against each other at the position where fusion splicing is to be performed with the electrodes 113. In this step, while the sheathed portion of the optical fiber cord 15 is placed into the receiving groove 63 of the carrying fiber holder 110, the carrying fiber holder 110 cannot be positioned by a movement mechanism. Therefore, the holding lid 71 of the carrying fiber holder 110 is kept open so that the optical fiber cord 15 is not held fast.

Fusion Splicing Step

In the above state, the electrodes 113 are caused to discharge electricity by operating the operation part 130 of the fusion splicer 101, whereby the end facets of the glass fibers 16 and 23 are fusion-spliced to each other.

Moving Step

Figure 8:
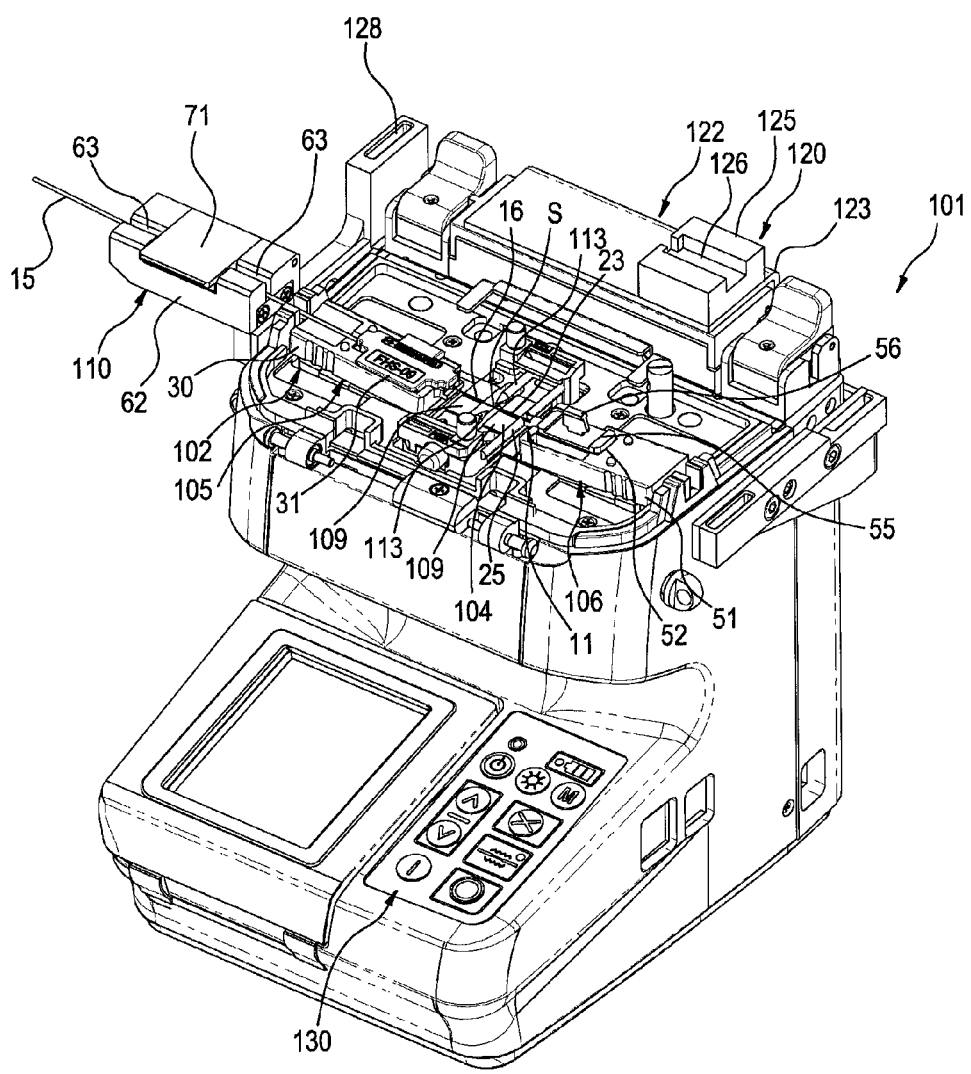
FIG. 8 is a perspective view of the fusion splicer that is in a state after fusion splicing is performed.
Figure 9:
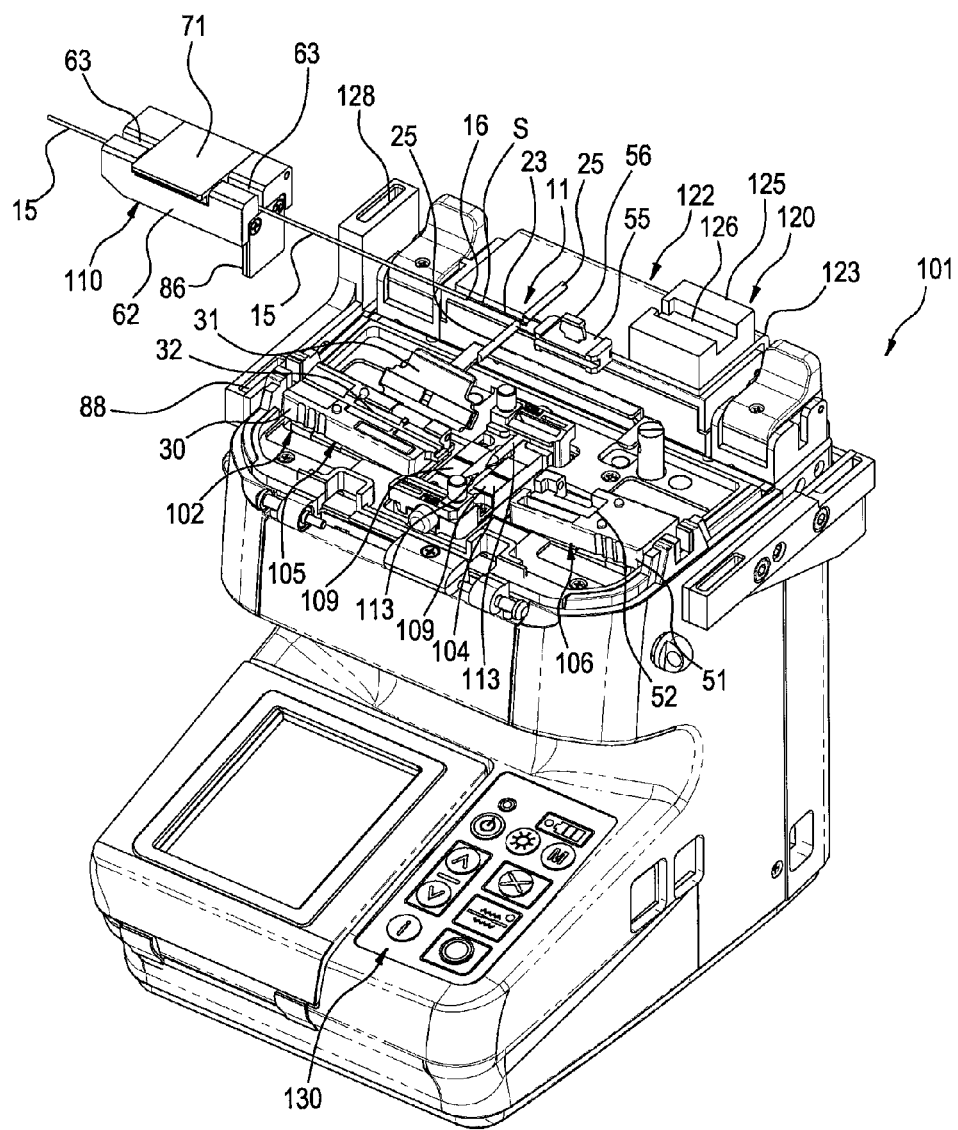
FIG. 9 is a perspective view of the fusion splicer that is in another state after fusion splicing is performed.

FIGS. 8 and 9 are perspective views of the fusion splicer 101 that is in respective states after fusion splicing is performed. When the fusion splicing of the glass fibers 16 and 23 is finished, the holding lid 71 of the carrying fiber holder 110 is closed, whereby the optical fiber cord 15 is held fast by the carrying fiber holder 110 (FIG. 8). Subsequently, the holding lid 31 of the fiber holder 105 is opened so that the optical fiber cord 15 held by the fiber holder 105 is released. Furthermore, the stub cap 55 is removed from the stub holder 106, and the carrying fiber holder 110 is removed from the fusion splicing working part 102 of the fusion splicer 101 (FIG. 9). Then, the stub cap 55 and the carrying fiber holder 110 are moved to the reinforcing working part 120.

Fiber Repositioning Step

Figure 10:
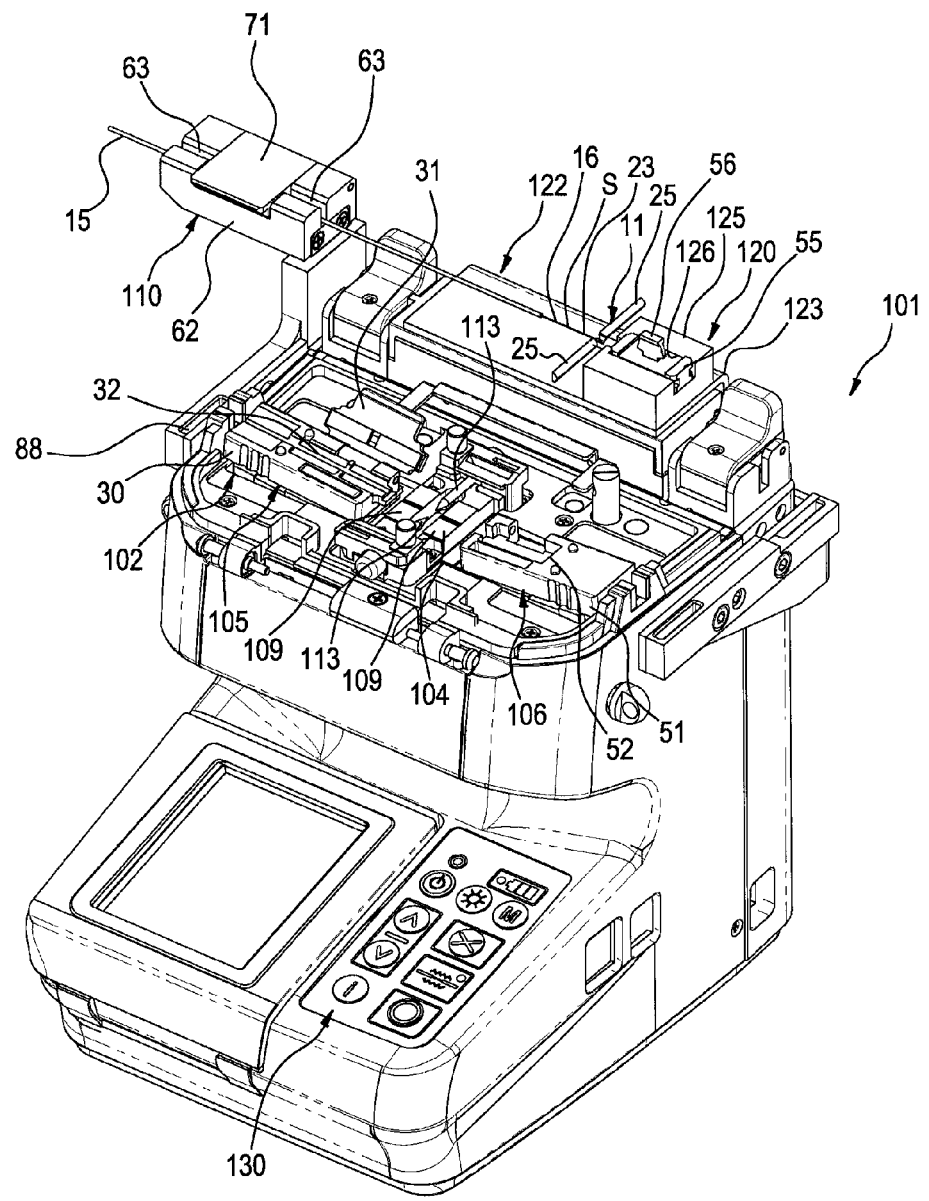
FIG. 10 is a perspective view of the fusion splicer in a fiber repositioning step performed at a reinforcing working part.

FIG. 10 is a perspective view of the fusion splicer 101 in a fiber repositioning step performed at the reinforcing working part. The anchor plate 86 of the carrying fiber holder 110 is inserted into the second reinforcing fixing part (anchor hole 128), whereby the carrying fiber holder 110 is attached to the reinforcing working part 120. Meanwhile, the stub cap 55 is fitted into the cap receiving recess 126 in the first reinforcing fixing part (cap holding part 125). In this step, the cap holding part 125 is urged by the urging member in the direction away from the anchor hole 128 to which the carrying fiber holder 110 is attached. Therefore, in a state where the cap holding part 125 is pushed in a direction opposite to the direction of urging by the urging member, the stub cap 55 is fitted into and is made to be held in the cap receiving recess 126 of the cap holding part 125.

In this manner, the carrying fiber holder 110 and the stub cap 55 are fixed to the reinforcing working part 120. Since the cap holding part 125 is urged by the urging member in the direction away from the anchor hole 128, a tension is applied to the optical fiber cord 15 and the embedded optical fiber 22 that extend between the carrying fiber holder 110 and the stub cap 55 that is held by the cap holding part 125. Hence, the glass fibers 16 and 23 that have been fusion-spliced to each other are straightened with no slack.

In a state where the stub cap 55 and the carrying fiber holder 110 are fixed to the reinforcing working part 120, the relative positional relationship between the stub cap 55 and the carrying fiber holder 110 becomes the same as that at the fusion splicing working part 102. Therefore, even if the optical fiber cord 15 and the embedded optical fiber 22 that have been fusion-spliced to each other are twisted between the carrying fiber holder 110 and the stub cap 55 while the carrying fiber holder 110 and the stub cap 55 are moved from the fusion splicing working part 102 to the reinforcing working part 120, any displacements of the carrying fiber holder 110 and the stub cap 55 about the axes thereof are undone by setting the carrying fiber holder 110 and the stub cap 55 onto the reinforcing working part 120. Thus, any twists are prevented from remaining in the spliced portion S between the glass fibers 16 and 23.

Reinforcing Step

Figure 11:
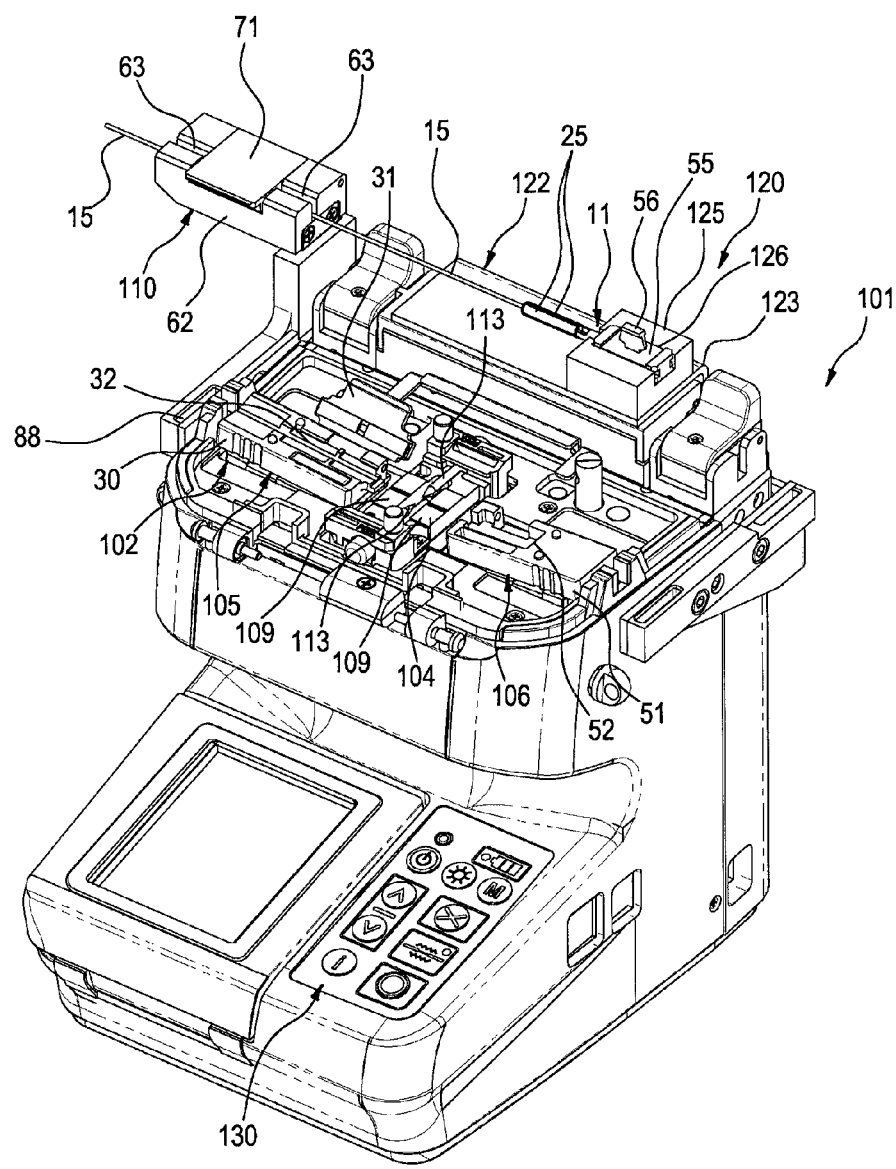
FIG. 11 is a perspective view of the fusion splicer in a reinforcing step performed at the reinforcing working part.

FIG. 11 is a perspective view of the fusion splicer in a reinforcing step performed at the reinforcing working part. After the carrying fiber holder 110 and the stub cap 55 are fixed to the reinforcing working part 120, the pieces of release paper 27 pasted to the reinforcing members 25 of the ferrule 21 included in the stub 11 are removed, whereby the contact surfaces 25*a*, to which the adhesive is applied, are exposed. Subsequently, the reinforcing members 25 are rotated toward the glass fibers 16 and 23 and are made to meet each other in such a manner as to cover the spliced portion S between the glass fibers 16 and 23 and the periphery thereof. Consequently, the reinforcing members 25 are bonded to each other with the adhesive. Thus, the spliced portion S between the glass fibers 16 and 23 and the periphery thereof are reinforced.

In the fusion splicing method according to the above embodiment, the stub cap 55 and the carrying fiber holder 110 having non-axisymmetric structures and fixed to the fusion splicing working part 102 are moved to the reinforcing working part 120 and are fixed thereto such that the relative positional relationship between the two becomes the same as that at the fusion splicing working part 102. Hence, the glass fiber 23 of the embedded optical fiber 22 and the glass fiber 16 of the outside optical fiber cord 15 that have been fusion-spliced to each other can be reinforced with no bends or no twists in them. Furthermore, at the reinforcing working part 120, a tension is applied to the glass fiber 23 of the embedded optical fiber 22 and the glass fiber 16 of the outside optical fiber cord 15 that have been fusion-spliced to each other. Therefore, the glass fiber 23 of the embedded optical fiber 22 and the glass fiber 16 of the outside optical fiber cord 15 that have been fusion-spliced to each other can be reinforced with no slack in them.

That is, without any cost increase that may occur by providing exclusive carrying devices such as large-scale movement mechanisms, the spliced portion S can be reinforced with no bends, no twists, and no slack in the glass fiber 23 of the embedded optical fiber 22 and the glass fiber 16 of the outside optical fiber cord 15. Consequently, the reliability of the reinforced portion is increased significantly.

In the above embodiment, the carrying fiber holder 110 may be omitted. Instead, the fiber holder 105 may be detachable from both the fusion splicing working part 102 and the reinforcing working part 120. In such a case, after fusion splicing is performed at the fusion splicing working part 102 with the optical fiber cord 15 being gripped by the fiber holder 105, the fiber holder 105 and the stub cap 55 are moved to and fixed to the reinforcing working part 120, where the reinforcing work is performed.

The stub 11 is not limited to be configured such that one end of each of the reinforcing members 25 is connected to the ferrule 21 with a corresponding one of the hinge parts 26, and may be configured as a pair of reinforcing members 25 that are rotatably connected to each other at respective sides thereof with a hinge part. In such a configuration also, the spliced portion S can be reinforced by rotating the reinforcing members 25 about the hinge part in such a manner as to sandwich therebetween the glass fibers 16 and 23 including the spliced portion S.

The method of reinforcing the spliced portion S is not limited to a method in which the spliced portion S is sandwiched between a pair of reinforcing members 25, and may be a method in which the spliced portion S is covered with a reinforcing tube. In such a case, the spliced portion S is covered with a heat-shrinkable reinforcing tube. Subsequently, the cover 123 is removed, and the reinforcing tube is heated and is thus caused to shrink by the heat treating part 122.

In that case, the cap holding part 125 is provided at a position of the heat treating part 122 that is on the inner side of the cover 123, and the position at which the carrying fiber holder 110 is to be attached to the reinforcing working part 120 is lowered in accordance with the height of the cap holding part 125. In such a case also, the reinforcing tube shrinks with heat while not causing any twists and slack in the glass fibers 16 and 23. Therefore, the glass fibers 16 and 23 have no bends, no twists, and no slack at the reinforced portion.

As described above, in the fusion splicer 101, the cap holding part 125 that holds the stub cap 55 is provided on the cover 123 of the heat treating part 122 at which the spliced portion S is reinforced by causing the reinforcing tube to shrink with heat, and the carrying fiber holder 110 is attachable to and detachable from the reinforcing working part 120. That is, in the fusion splicer 101 according to the above embodiment, the reinforcing work in which the spliced portion S is reinforced with the reinforcing members 25 can be performed at the reinforcing working part 120. Moreover, the reinforcement of the spliced portion S with the reinforcing tube can be performed at the heat treating part 122.

The above embodiment concerns a case where fusion splicing and reinforcement are performed at the fusion splicing working part 102 and the reinforcing working part 120, respectively, of the fusion splicer 101. Alternatively, fusion splicing and reinforcement may be performed at another fusion splicing working part 102 and another reinforcing working part 120, respectively, provided at different positions such as different apparatuses.

INDUSTRIAL APPLICABILITY

The present invention is useful in attaching an optical connector to an optical fiber on site in a case where an access network is constructed with optical fibers.

The invention claimed is:

1. A method of fusion-splicing an embedded optical fiber included in a stub and an outside optical fiber to each other, the method comprising:
   attaching a stub cap having a non-axisymmetric structure to the stub;
   positioning the embedded optical fiber and the outside optical fiber to a fusion splicing working part by fixing the stub cap to the fusion splicing working part and by gripping the outside optical fiber with a fiber holder that is fixed to the fusion splicing working part;
   fusion-splicing the embedded optical fiber and the outside optical fiber to each other;
   gripping the outside optical fiber at the fusion splicing working part with a carrying fiber holder different from the fiber holder and having a non-axisymmetric structure and fitting an anchor plate into a first anchor hole in the fusion splicing working part;
   repositioning the embedded optical fiber and the outside optical fiber to a reinforcing working part by fixing the stub cap to the reinforcing working part and fitting the anchor plate of the carrying fiber holder into a second anchor hole in the reinforcing working part such that a relative positional relationship between the stub cap and the carrying fiber holder becomes the same as that at the fusion splicing working part; and
   reinforcing a spliced portion between the embedded optical fiber and the outside optical fiber while a tension is applied to the embedded optical fiber and the outside optical fiber.

2. A method of fusion-splicing an embedded optical fiber included in a stub and an outside optical fiber to each other, the method comprising:
   attaching a stub cap having a non-axisymmetric structure to the stub;
   gripping the outside optical fiber with a fiber holder having a non-axisymmetric structure and an having anchor plate;
   positioning the embedded optical fiber and the outside optical fiber to a fusion splicing working part by fixing the stub cap to the fusion splicing working part and fitting the anchor plate of the fiber holder into a first anchor hole in the fusion splicing working part;
   fusion-splicing the embedded optical fiber and the outside optical fiber to each other;
   repositioning the embedded optical fiber and the outside optical fiber to a reinforcing working part by fixing the stub cap to the reinforcing working part and fitting the anchor plate of the fiber holder into a second anchor hole in the reinforcing working part such that a relative positional relationship between the stub cap and the fiber holder becomes the same as that at the fusion splicing working part; and
   reinforcing a spliced portion between the embedded optical fiber and the outside optical fiber while a tension is applied to the embedded optical fiber and the outside optical fiber.

3. A fusion splicer comprising:
   a fusion splicing working part including
      a first fusion splicing fixing part to which a stub cap having a non-axisymmetric structure and attached to a stub that includes an embedded optical fiber is fixed,
      a second fusion splicing fixing part, wherein the second fusion splicing fixing part includes a first anchor hole into which an anchor plate of a first fiber holder having a non-axisymmetric structure and configured to grip an outside optical fiber is fitted,
      a second fiber holder configured to grip the outside optical fiber at a position that is nearer to the tip than a position gripped by the first fiber holder, and
      a fusion splicing processing part at which the embedded optical fiber and the outside optical fiber that are axially aligned with each other by the first fusion splicing fixing part and the second fiber holder, respectively, are to be fusion-spliced to each other; and
   a reinforcing working part including
      a first reinforcing fixing part to which the stub cap is fixed,
      a second reinforcing fixing part, wherein the second reinforcing fixing part includes a second anchor hole into which the anchor plate of the fiber holder is fitted, the first reinforcing fixing part and the second reinforcing fixing part are in the same relative positional relationship as the first fusion splicing fixing part and the second fusion splicing fixing part, and
      an urging member that applies a tension to the embedded optical fiber and the outside optical fiber that are fusion-spliced to each other and positioned by the first reinforcing fixing part and the second reinforcing fixing part, the reinforcing working part being configured to reinforce a spliced portion between the embedded optical fiber and the outside optical fiber.

4. A fusion splicer comprising:
   a fusion splicing working part including
      a first fusion splicing fixing part to which a stub cap having a non-axisymmetric structure and attached to a stub that includes an embedded optical fiber is to be fixed,
      a second fusion splicing fixing part, wherein the second fusion splicing fixing part includes a first anchor hole into which an anchor plate of a fiber holder having a non-axisymmetric structure and configured to grip an outside optical fiber is fitted, and
      a fusion splicing processing part at which the embedded optical fiber and the outside optical fiber that are axially aligned with each other by the first fusion splicing fixing part and the second fusion splicing fixing part, respectively, are to be fusion-spliced to each other; and
   a reinforcing working part including
      a first reinforcing fixing part to which the stub cap is fixed,
      a second reinforcing fixing part, wherein the second reinforcing fixing part includes a second anchor hole into which the anchor plate of the fiber holder is fitted, the first reinforcing fixing part and the second reinforcing fixing part are in the same relative positional relationship as the first fusion splicing fixing part and the second fusion splicing fixing part, and
      an urging member that applies a tension to the embedded optical fiber and the outside optical fiber that are fusion spliced to each other and positioned by the first reinforcing fixing part and the second reinforcing fixing part, respectively, the reinforcing working part being configured to reinforce a spliced portion between the embedded optical fiber and the outside optical fiber.

* * * * *